US008306994B2

(12) United States Patent
Kenworthy

(10) Patent No.: US 8,306,994 B2
(45) Date of Patent: Nov. 6, 2012

(54) NETWORK ATTACHED DEVICE WITH DEDICATED FIREWALL SECURITY

(75) Inventor: Stacy Kenworthy, Atlanta, GA (US)

(73) Assignee: Robust Networks, LLC, Wilmington, DE (US)

( * ) Notice: Subject to any disclaimer, the term of this patent is extended or adjusted under 35 U.S.C. 154(b) by 112 days.

(21) Appl. No.: 12/773,716

(22) Filed: May 4, 2010

(65) Prior Publication Data
US 2010/0242098 A1      Sep. 23, 2010

Related U.S. Application Data

(63) Continuation of application No. 09/951,877, filed on Sep. 11, 2001, now Pat. No. 7,739,302, which is a continuation of application No. 09/144,954, filed on Sep. 1, 1998, now Pat. No. 6,317,837.

(51) Int. Cl.
*G06F 17/30* (2006.01)
(52) U.S. Cl. ........ 707/769; 707/781; 707/827; 709/217; 709/223; 711/111
(58) Field of Classification Search .......... 707/781, 707/769; 709/223, 225, 238, 217; 711/111
See application file for complete search history.

(56) References Cited

U.S. PATENT DOCUMENTS

| | | | | |
|---|---|---|---|---|
| 5,247,670 A | * | 9/1993 | Matsunaga | 709/203 |
| 5,416,842 A | * | 5/1995 | Aziz | 380/30 |
| 5,440,719 A | * | 8/1995 | Hanes et al. | 703/21 |
| 5,548,721 A | * | 8/1996 | Denslow | 726/9 |
| 5,577,209 A | * | 11/1996 | Boyle et al. | 726/4 |
| 5,623,601 A | * | 4/1997 | Vu | 726/12 |
| 5,642,337 A | * | 6/1997 | Oskay et al. | 709/230 |
| 5,652,908 A | * | 7/1997 | Douglas et al. | 714/4 |
| 5,655,077 A | * | 8/1997 | Jones et al. | 726/8 |
| 5,692,124 A | * | 11/1997 | Holden et al. | 726/2 |
| 5,719,786 A | * | 2/1998 | Nelson et al. | 709/219 |
| 5,757,924 A | * | 5/1998 | Friedman et al. | 713/151 |
| 5,778,174 A | * | 7/1998 | Cain | 726/11 |
| 5,826,014 A | * | 10/1998 | Coley et al. | 726/12 |
| 5,832,503 A | * | 11/1998 | Malik et al. | 709/223 |

(Continued)

FOREIGN PATENT DOCUMENTS
EP        1396960        3/2004
(Continued)

OTHER PUBLICATIONS

Gobioff, Howard et al., "Security for Network Attached Storage Devices", Carnegie Mellon University Computer Science technical report CMU-CS-97-185, Oct. 1997, pp. 1-20.*

(Continued)

*Primary Examiner* — Shahid Alam
(74) *Attorney, Agent, or Firm* — Woodcock Washburn LLP

(57) ABSTRACT

Dedicated firewall security for a network attached device (NAD) is provided by a firewall management system integrated directly into the NAD or into a NAD server. A local area network arrangement includes a network client and the NAD and the firewall management system includes computer readable medium having computer-executable instructions that perform the steps of receiving a request for network access to the NAD from the network client, determining whether the request for network access to the NAD is authorized, and only if the request for network access is authorized, providing the network client with network access to the NAD.

22 Claims, 8 Drawing Sheets

U.S. PATENT DOCUMENTS

| | | | | |
|---|---|---|---|---|
| 5,909,493 | A * | 6/1999 | Motoyama | 713/154 |
| 5,958,015 | A * | 9/1999 | Dascalu | 709/229 |
| 5,960,177 | A * | 9/1999 | Tanno | 709/229 |
| 5,968,176 | A * | 10/1999 | Nessett et al. | 726/11 |
| 5,974,463 | A * | 10/1999 | Warrier et al. | 709/225 |
| 5,987,547 | A * | 11/1999 | Panasik et al. | 710/301 |
| 5,991,807 | A * | 11/1999 | Schmidt et al. | 709/225 |
| 5,996,077 | A * | 11/1999 | Williams | 726/12 |
| 6,009,475 | A * | 12/1999 | Shrader | 709/249 |
| 6,032,259 | A * | 2/2000 | Nemoto | 726/3 |
| 6,047,322 | A * | 4/2000 | Vaid et al. | 709/224 |
| 6,047,353 | A * | 4/2000 | Vishlitzky et al. | 711/111 |
| 6,061,797 | A * | 5/2000 | Jade et al. | 726/15 |
| 6,088,796 | A * | 7/2000 | Cianfrocca et al. | 713/152 |
| 6,104,716 | A * | 8/2000 | Crichton et al. | 370/401 |
| 6,105,027 | A * | 8/2000 | Schneider et al. | 707/781 |
| 6,119,235 | A * | 9/2000 | Vaid et al. | 726/11 |
| 6,119,236 | A * | 9/2000 | Shipley | 726/22 |
| 6,130,892 | A * | 10/2000 | Short et al. | 370/401 |
| 6,141,755 | A * | 10/2000 | Dowd et al. | 726/11 |
| 6,154,843 | A * | 11/2000 | Hart et al. | 726/21 |
| 6,202,081 | B1 * | 3/2001 | Naudus | 709/200 |
| 6,233,618 | B1 * | 5/2001 | Shannon | 709/229 |
| 6,260,120 | B1 * | 7/2001 | Blumenau et al. | 711/152 |
| 6,260,148 | B1 * | 7/2001 | Aggarwal et al. | 726/14 |
| 6,292,795 | B1 * | 9/2001 | Peters et al. | 707/769 |
| 6,321,336 | B1 * | 11/2001 | Applegate et al. | 726/11 |
| 6,345,300 | B1 * | 2/2002 | Bakshi et al. | 709/229 |
| 6,349,336 | B1 * | 2/2002 | Sit et al. | 709/227 |
| 6,393,474 | B1 * | 5/2002 | Eichert et al. | 709/223 |
| 6,539,425 | B1 * | 3/2003 | Stevens et al. | 709/220 |
| 6,715,084 | B2 | 3/2004 | Aaron et al. | |
| 6,717,084 | B1 * | 4/2004 | Lu | 200/462 |
| 6,751,677 | B1 * | 6/2004 | Ilnicki et al. | 719/316 |
| 6,877,041 | B2 * | 4/2005 | Sullivan et al. | 709/238 |
| 7,120,931 | B1 * | 10/2006 | Cheriton | 726/13 |
| 7,743,111 | B2 * | 6/2010 | Soltis | 709/217 |
| 7,840,619 | B2 * | 11/2010 | Horn | 707/829 |
| 2002/0004883 | A1 * | 1/2002 | Nguyen et al. | 711/111 |

FOREIGN PATENT DOCUMENTS

| | | |
|---|---|---|
| EP | 1420600 | 5/2004 |
| GB | 2318031 | 4/1998 |
| GB | 2323757 | 9/1998 |
| WO | WO 98/22866 | 5/1998 |
| WO | WO 98/26548 | 6/1998 |
| WO | WO 98/31124 | 7/1998 |
| WO | WO 98/32077 | 7/1998 |
| WO | WO 99/12298 | 3/1999 |
| WO | WO 99/46906 | 9/1999 |

OTHER PUBLICATIONS

Menasce, Daniel A. et al., "An Analytic Model of Hierarchical Mass Storage Systems with Network-Attached Storage Devices", ACM, SIGMETRIC, 1996, pp. 180-189.*

Menasce, Daniel et al., "An Analytical Model of Hierarchical MAss Storage Systems with Network Attached Storage Devices", Proceedings of the 1996 ACM SIGMETRICS International Conference on Measurement and Modeling of Computer Systems; ACM SIGMETRICS Performance Evaluation Review, vol. 24, Issue 1, May 1996, pp. 180-189.*

Al-Tawil, et al., "Evaluation and Testing of Internet Firewalls," International Journal of Network Management, (no month available) 1999, pp. 135-149.

Axis Communications, Thin Server Technology, "What is ThinServer Technology?," Dec. 31, 1997, retrieved from internet at URL:http://www.axis.com.hk/tempage/thinserver.htm, pp. 1-3 on Mar. 19, 1998.

Cant, et al., "Simple Assured Bastion Hosts," IEEE (no month available) 1997, pp. 24-33.

Catapult Inc., "Understanding Thin-Client/Server Computing," (no month available) 1997, retrieved from internet at <URL:http://mspress.microsoft.com/prod/b on Mar. 19, 1998.

Caulfield, "Data General Encounters Crowded Thin-Server Market," internet.com WEBWEEK, Sep. 8, 1997, retrieved from internet at <URL:http://internetwold.com/print/1997/09/08/news/19970908-thin.html> on Mar. 19, 1998, 1 page.

CITRIX Thin-Client/NC (Network Computer), Thin Client Computing, "Citrix Takes Thin-Client/Server Computing to Next Level with Enhancements to Winframe," Jun. 17, 1997, retrieved from the internet at <URL:http://www.citrix.com/news/releases/prOct01.htm> on Mar. 19, 1998, pp. 1-2.

CITRIX Thin-Client/Server Computing, "Citrix WinFrame Thin-Client/Server Software Receives Computing Award for Excellence," Oct. 2, 1997, retrieved from the internet at <URL:http://www.eu.citrix.com/news/releases/prJune06.htm> on Mar. 19, 1998, pp. 1-2.

Godioff, et al., "Security for Network Attached Storages Devices," CMU-CS-97-185, Oct. 23, 1997, pp. 1-18.

Mateyaschuk, "Network Power & Light to Ship Thin File Server," CMPnet, The Technology Network, Sep. 12, 1997, retrieved from the internet at <URL:http://techweb.cmp.com/iw/newsflash/nf647/0912_st3.htm> on Mar. 19, 1998, pp. 1-2.

Rader, et al., "Public/Private/Wireless Information Security A Blue Print for Safeguarding Sensitive Information," ONDCP/CTAC International Symposium, Aug. 18-22, 1997, pp. 1-9.

Real World Solutions, "Thin Client/Server Computing," CITRIX, retrieved from internet at <URL:http://www.cplus.net/citrix.html> on Mar. 19, 1998, pp. 1-3.

Roberts, "Internet Servers: A New Class of Turnkey Web Servers Helps Corporate Networks Take the Effort Out of the Internet," Nov. 21, 1997, retrieved from the internet at <URL:http://www.data.com/roundups/turnk.

Schuba, et al., "A Reference Model for Firewall Technology," IEEE 1997, pp. 133-145.

Warrier, "US, a Platform for Heterogeneous Interconnection Network Management, Selected Areas in Communications," IEEE 8(1), Jun. 1990, pp. 119-126.

MacroCom, Thin Client/NC (Network computer), Thin Client Computing, "Client Server Moves to Server/Client," (no month available) 1997, retrieved from internet at <URL:http://www.MaxFrame.com/THINCLTN.HTM>, on Mar. 19, 1998, pp. 1-5.

Gibson, et al., "Network Attached Storage Architecture," Communications of the ACM 43(11), Nov. 2000, pp. 37-45.

Van Meter, "A Brief Survey of Current Work on Network Attached Peripherals (1996)," Information Sciences Institute, Jan. 19, 1996, pp. 1-14.

* cited by examiner

NETWORK ATTACHED DEVICE WITH DEDICATED FIREWALL SECURITY

I. CROSS REFERENCE TO RELATED APPLICATION

This application is a continuation of U.S. patent application Ser. No. 09/951,877, filed on Sep. 11, 2001, which is a continuation of U.S. patent application Ser. No. 09/144,954 filed on Sep. 1, 1998, to Stacy Kenworthy, now U.S. Pat. No. 6,317,837.

II. FIELD OF THE PRESENT INVENTION

The present invention relates generally to dedicated security for a network attached device in a computer network environment. In particular, the present invention relates to a management system for providing access to and security for data on network attached devices.

III. BACKGROUND OF THE PRESENT INVENTION

A network attached device (NAD) may be any type of hardware unit that is connected to a computer network. Exemplary NADs include, but are not limited to: CD-ROM drives, DVD drives, optical drives, tape drives, hard disk drives, ZIP drives, JAZ drives, routers, printers, facsimile machines, audio devices, and video devices. NADs are generally connected to a local area network (LAN) via a NAD server. A NAD server provides the users of the LAN with access to the resources of the network.

A NAD server generally refers to a node (computer) on the LAN that permits other nodes on the LAN to access one or more NADs. A NAD server processes NAD-access requests and provides the appropriate access to a NAD. The NAD server may send incoming data from the requesting node to the NAD, or may retrieve data from the NAD and send the retrieved data back to the requesting node. NAD servers are generally dedicated servers, meaning that their sole purpose is to provide access to NADs. NAD servers often support multiple network protocols, which allow them to accept NAD-access requests from various nodes in a heterogeneous network environment.

Most LANs are, or should be, protected by a bastion firewall. Bastion firewalls restrict access between an internal network, such as a LAN, and an external network, such as the Internet. Bastion firewalls are considered to be uni-directional, i.e., protecting the internal network from unauthorized traffic in-coming from the external network. Bastion firewalls are designed to run as few applications as possible in order to reduce the number of potential security risks. As such, bastion firewalls do not perform data management tasks.

Bastion firewalls are typically the only layer of security for NADs attached to a LAN. NAD servers are not equipped with a second layer of security because it is generally accepted that such a second layer of security is redundant with the bastion firewall. Therefore, once a bastion firewall is penetrated, whether by an authorized or unauthorized user, the user typically gains unrestricted access to all resources of the LAN, including any NADs. However, the level of security provided by a bastion firewall may not always supply adequate protection for the NADs of a LAN. For example, it may be desirable to establish varying levels of security clearance, such that only certain authorized users of the LAN are permitted to access a particular NAD server. Also, if a NAD server provides access to valuable or sensitive data stored on a NAD, it may be desirable to implement extra security measures to prevent an unauthorized user of the LAN, who happens to penetrate the bastion firewall, from gaining access to the NADs.

Accordingly, there remains a need for a NAD server having an integrated firewall, which provides an additional layer of security for a NAD beyond that provided by a bastion firewall.

IV. SUMMARY OF THE PRESENT INVENTION

The present invention fulfills the need in the art by providing a network attached device server having integrated firewall security. The NAD server is provided for implementing a network attached device and firewall management system (NADFW-MS). The NADFW-MS comprises a firewall component for determining whether requests for NAD-access are authorized and a data management component for accepting an authorized request from the firewall component and providing the requested access to the NAD. NAD-access requests are sent to the NAD server by a network node, such as a network client. The NAD-access requests are contained in data packets having headers. The firewall component accepts the data packets and determines whether the data packets are authorized based on information included in the data packet headers.

The firewall component implements a series of tests to determine whether a data packet is valid. For example, the firewall component may determine that a data packet is authorized by: determining that the information in the data packet header is complete; determining that the information in the data packet header indicates that the data packet arrived at the NAD server via an authorized network interface; determining that the data packet header contains a valid source address; determining that the data packet header contains a valid destination address; and determining that the data packet header contains proper information to access a proper port of the NAD server. If a data packet fails any one of the firewall component's filtering tests, the data packet is discarded. Whenever a data packet is discarded, the reason for discarding the data packet may be recorded in a log file for future reference.

An authorized data packet is passed from the firewall component to the data management component. The data management component comprises one or more network protocol programs that are compatible with authorized data packets sent by various heterogeneous network nodes. The data management component also comprises one or more interface mechanisms, such as ODE, SCSO, EODE, Fiber Channel, etc., that allow the NADFW-MS to communicate with various types of associated NADs. The data management component provides access to an appropriate NAD by using a network protocol program to communicate a NAD-access request to an interface mechanism, which in turn communicates with the NAD. Alternatively, the data management component may provide access to the appropriate NAD by acting as a proxy server. In the capacity of a proxy server, the data management component generates a new data packet, based on the NAD-access request, and sends the new data packets to a second NAD server.

V. BRIEF DESCRIPTION OF THE DRAWINGS

VI. DETAILED DESCRIPTION OF THE EXEMPLARY EMBODIMENTS

The present invention fulfills the need in the art by providing an improved NAD server having integrated firewall functionality. The improved NAD server implements a network attached device and firewall management system (NADFW-MS). The NADFW MS may be thought of as having two components: a firewall component for providing a second layer of network security to maintain the integrity of an associated NAD; and a data management component for providing access to one or more associated NADs. The firewall component, in effect, wraps a dedicated firewall around only an associated NAD. The data management component accepts authorized data packets from the firewall component and processes NAD-access requests contained therein.

The description of the exemplary embodiments of the present invention will hereinafter refer to the drawings, in which like numerals indicate like elements throughout the several figures. Beginning with FIG. 1, an exemplary NAD server 110 for implementing a NADFWMS 111 is shown as being connected to a LAN 112. As mentioned, the NADFW-MS 111 provides security for and access to various NADs 116 that are attached to the LAN 112 via the NADFW-MS 111. The exemplary NADs shown are a CD-ROM tower 116A, a printer 116B and video codec 116C. Those skilled in the art will recognize that a NAD may be any typo of hardware device that is attached to a computer network. As can be seen, the NADFW-MS 111 wraps a dedicated firewall 117A-C around each of the associated NADs 116A-C, respectively.

Figure 1:
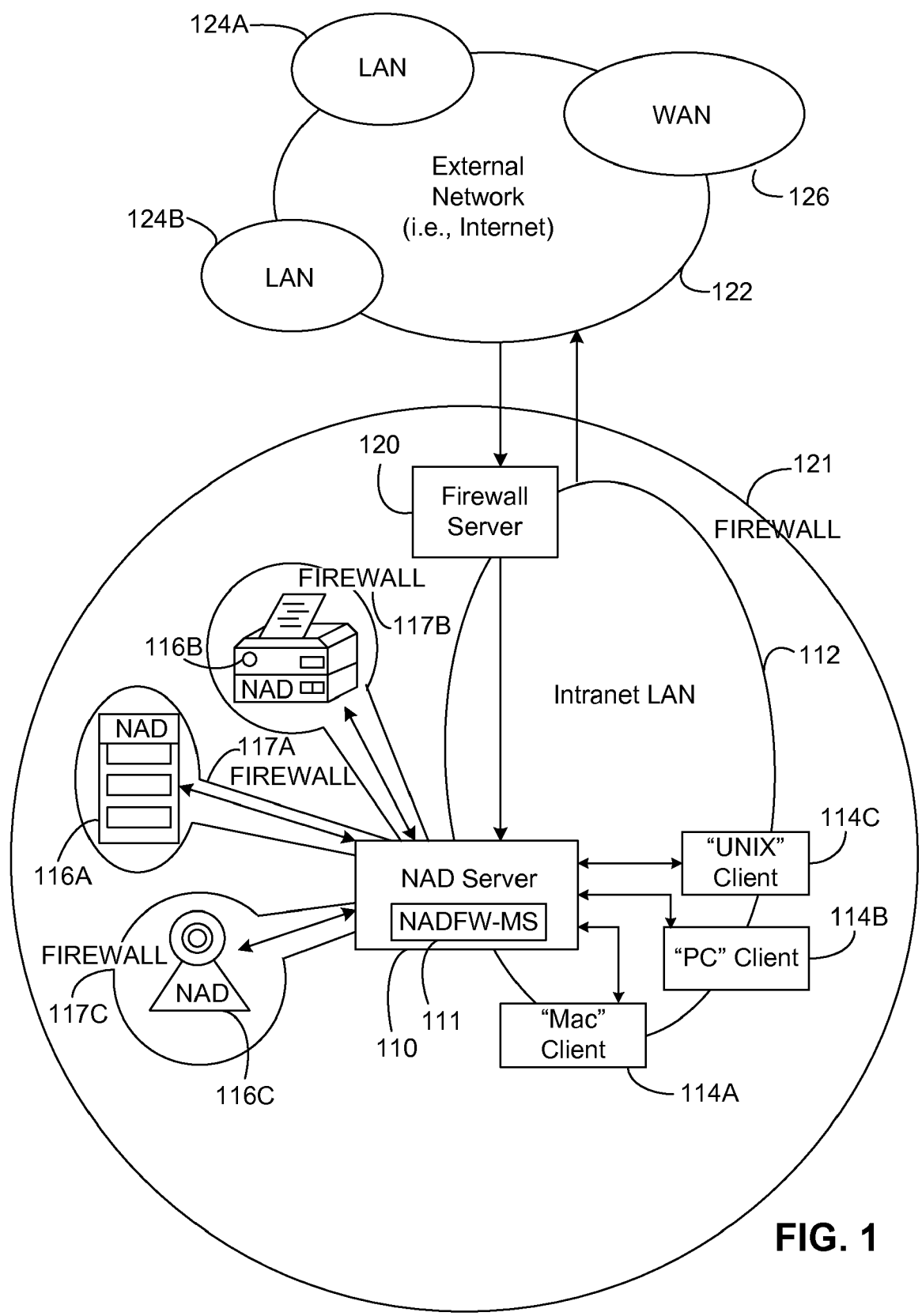
FIG. 1 is a functional block diagram of the general architecture of an exemplary embodiment of the present invention.

Also connected to the LAN 112 are several network clients 114A-C. The LAN 112 may further include other types of network nodes, such as other commonly known servers or workstations (not shown). For the sake of simplicity, other network nodes are not shown because network clients 114 and the NAD server 110 are the nodes that are most relevant to the present embodiment. Network clients 114 send data packets, containing NAD-access requests, to the NAD server 110. The NADFW-MS 111 filters the in-coming data packets according to information contained in the header of the data packets. Those data packets that are not rejected by the filtering procedure are processed by the NADFW-MS 111 and the appropriate NAD-access is provided to the requesting network client 114. As illustrated in FIG. 1, the NADFW-MS 111 provides direct access to each NAD 116; however, the NADFW-MS 111 may alternatively act as a proxy server for another NAD server (see FIG. 7 and associated discussion herein). In the capacity of a proxy server, the NADFW-MS 111 may generate a new data packet, based on information in the original data packet, and forward the new data packet to another NAD server, such as a CD-ROM server, a mail server, or any other dedicated server typically connected to a computer network.

As shown, the LAN 112 is separated from an external network 122 by a bastion firewall server 120. The bastion firewall server 120 creates a uni-directional firewall 121 that guards the LAN 112 against unauthorized data packets coming in from the external network 122. The bastion firewall server 120, in effect, wraps a bastion firewall 121 around the entire LAN 112. Clients from the external network 122 must penetrate the bastion firewall 121 in order to gain access to the LAN 112. Then, in order to gain access to the NADs 116 attached to the LAN 112, clients from the external network 122 must penetrate the second layer of security provided by the NADFW-MS 111 of the NAD server 110. As shown, the external network 122 may be any remote network, such as the Internet, and may comprise other LANs 124A-B or wide area networks (WANs) 126.

Figure 2:
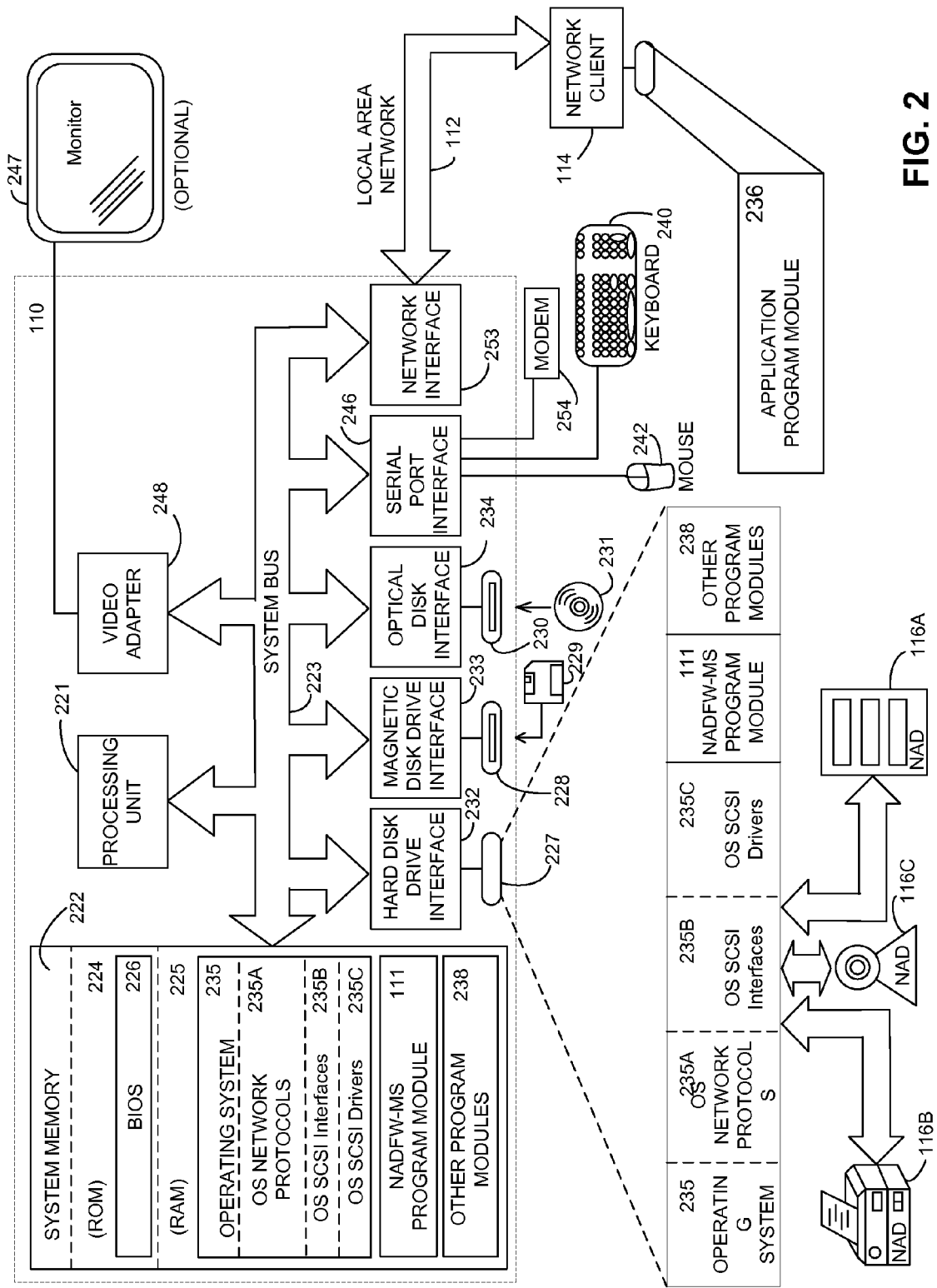
FIG. 2 is a functional block diagram of an exemplary network attached device (NAD) server that provides an operating environment for the exemplary embodiments of a network attached device and firewall management system (NADFW-MS) of the present invention.

FIG. 2 describes a NAD server 110, which serves as an exemplary operating environment for the present invention. The primary purpose of the NAD server 110 is to implement a NADFW-MS program module 111 that comprises computer-implemented instructions for providing access to and security for data stored on a NAD 116. The exemplary NAD server 110 may be a conventional computer system that is configured to operate as a dedicated network server. The NAD server 110 includes a processing unit 221, a system memory 222, and a system bus 223 that couples the system memory 222 to the processing unit 221. The system memory 222 includes read only memory (ROM) 224 and random access memory (RAM) 225. A basic input/output system (BIOS) 226, containing the basic routines that help to transfer information between elements within the NAD server 110, such as during start-up, is stored in ROM 224.

The NAD server 110 further includes a data storage mechanism such as a Storage ROM. The NAD server 110 may optionally include a hard disk drive 227 or a magnetic disk drive 228, e.g., to read from or write to a removable disk 229, and/or an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage for the NAD server 110. Although the description of computer-readable media above refers to a hard disk, a removable magnetic disk, and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment. A number of program modules may be stored in computer readable media of the NAD server 110, including an operating system 235, the NADFW-MS program module 111 and other program modules 238. The operating system (OS) 235 may comprises OS network protocol programs 235A to provide communications compatibility with other network nodes, such as network client 114. The operating system 235 may also comprise OS interface such as an SCSI interface 235B and SCSI drivers 235C to be used for communicating with NADs 116.

The NAD server 110 operates in a networked computer environment, using logical connections to one or more remote computers, such as a network client 114. Remote computers may also be another network server, a router, a peer device, or other common network node. The logical connections depicted in FIG. 2 include a local area network (LAN) 112. Such networking environments are commonplace in offices, enterprise-wide computer networks, and intranets. When used in a LAN networking environment, the NAD server 110 is connected to the LAN 112 through a network interface 253. Network connections may also be established via a modem 254. The modem 254, which may be internal or external, is connected to the system bus 223 via the serial port interface 246. It will be appreciated that the network connections shown are exemplary and other means of establishing a communications link between the computer systems may be used.

Stored in the remote memory storage device 250 of the network client 114 may be various program modules, including an application program module 236. Application program module 238 may generate requests for access to a NAD 116. The NAD-access requests are transported over the LAN 112 to the NAD server 110 in the form of data packets. The data packets are screened by the NADFW-MS program module 111 and, if authorized, the NADFW-MS program module 111 grants the requested access to the appropriate NAD 116.

NAD server 110 may be equipped with a number of input devices, such as a keyboard 240 and a mouse 242. Other input devices (not shown) may include a microphone, joystick, game pad, satellite dish, scanner, or the like. These and other input devices are often connected to the processing unit 221 through a serial port interface 246 that is coupled to the system bus 223, but may be connected by other interfaces, such as a game port or a universal serial bus (USB) (not shown). A monitor 247 or other type of display device may also be connected to the system bus 223 via an interface, such as a video adapter 248. In addition to the monitor, the exemplary NAD server 110 may include other peripheral output devices (not shown), such as speakers. A NAD server may be managed remotely by network clients. A remotely managed NAD server is referred to as a "headless" NAD server. Network clients manage a headless server in a secure environment by sending and receiving encrypted access and transfer commands to and from the NAD server.

Those skilled in the art will appreciate that the invention may be to practiced with network server configurations other than the one shown, such as: multiprocessor systems, microprocessor-based or programmable consumer electronics, minicomputers, mainframe computers, and the like. The invention may also be practiced in distributed computing environments where tasks are performed by remote processing devices that are linked through the communications network. In a distributed computing environment, program modules may be located in both local and remote memory storage devices.

Notwithstanding the broad applicability of the principles of the present invention, it A5 should be understood that the configuration of the exemplary NADFW-MS program module 111 for widely-used NAD servers 110 provides significant advantages. In particular, the NADFW-MS program module 111, comprising computer-implemented instructions for providing access to and security for data stored on a NAD 116, is specifically designed to exhibit acceptable memory-use and performance characteristics when implemented on the conventional NAD server 110. In so configuring the NADFW-MS program module 111, certain compromises, particularly between the often conflicting goals of minimizing memory storage and increasing performance speed, have necessarily been made. It should be understood that variations of the compromises made in the exemplary embodiments described in this specification are within the spirit and scope of the present invention, particularly in view of the fact that inevitable improvements in computer hardware and memory storage devices will make other compromises feasible.

Figure 3:
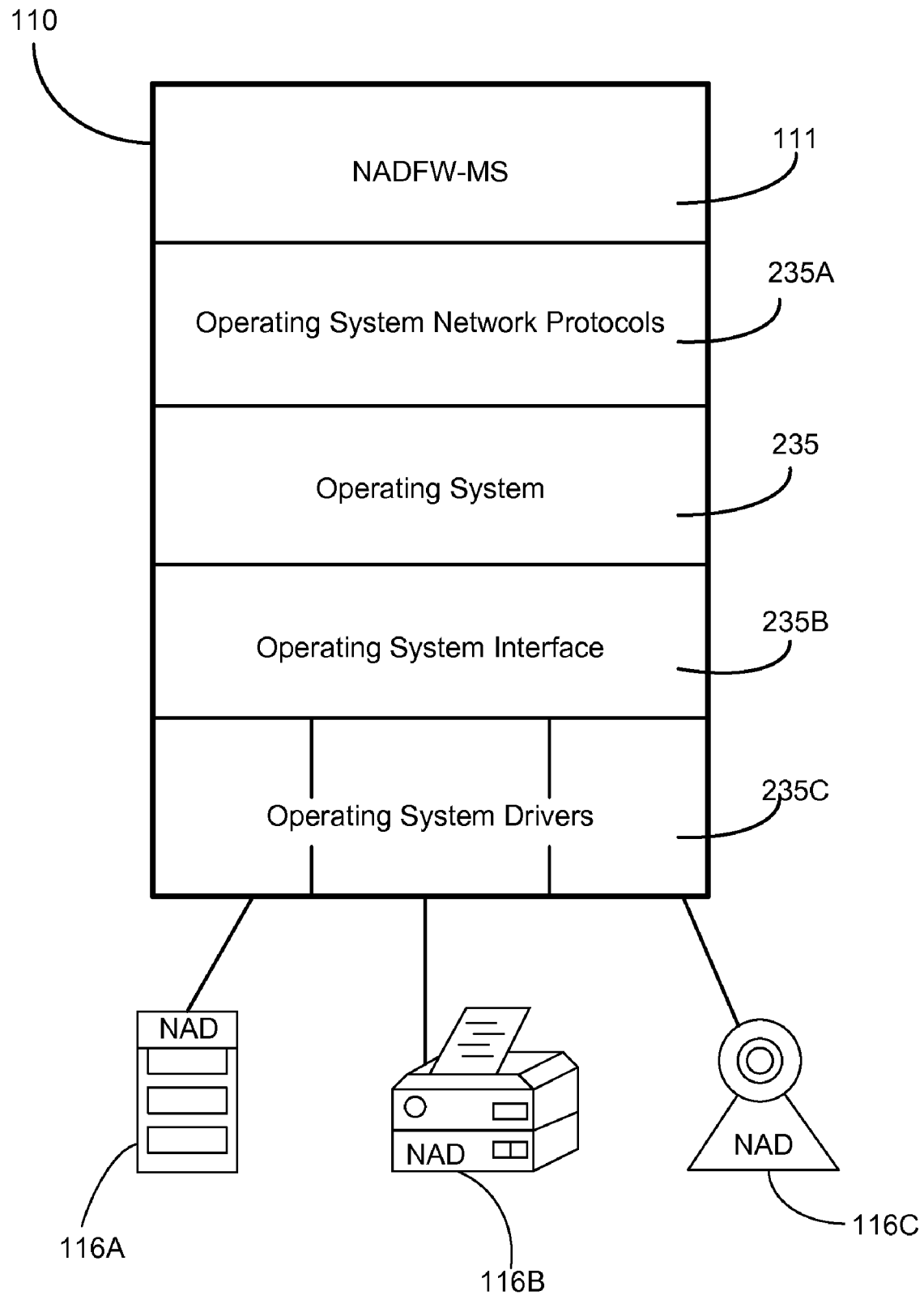
FIG. 3 is a functional block diagram of an internal communication scheme used by an exemplary NAD server to provide access to a NAD.

FIG. 3 illustrates the internal communications scheme used by the exemplary NAD server 110 for the purpose of accessing a NAD 116. The NADFW-MS 111 provides security for the NADs 116 by serving as a filtering firewall and/or a proxy firewall. Data packets that pass through the firewall of the NADFW-MS 111 are processed by the operating system (OS) 235 of the NAD server 110. The OS 235 includes network protocol programs 235A that provide a link between a network client 114 and the NADs 116. OS network protocol programs 235A must be compatible with the network protocol program of the network client 114 that is requesting NAD-access. The exemplary NAD server 110 includes multiple OS network protocol programs 235A, so as to provide NAD-access to multiple types of network clients 114 in a heterogeneous network environment. LAN 112, as shown in FIG. 1, is an example of a heterogeneous network environment that comprises a "Mac" network client 114A, running the "Macintosh" operating system, a "PC" network client 114B, running "DOS," and a "UNIX" network client 114C, running the "UNIX" operating system. For example, the "Mac" network client 114A would likely utilize the "Appletalk" network protocol, while the "PC" network client 114B would likely utilize Novell's "Netware" protocol and the "UNIX" network client 114C would likely utilize the TCP/IP standard. The inclusion of multiple OS network protocol programs 235A in the exemplary NAD server 110, allows the NAD server 110 to provide discriminatory NAD-access to heterogeneous network clients 114A-C based on the IP addresses of the network clients 114A-C or other information contained in the header of a data packet. The OS 235 uses the OS network protocol programs 235A to communicate with the OS Small Computer System Interface (SCSI) mechanisms, which in turn communicate with the NADs 116. The SCSI mechanisms shown are the SCSI interfaces 235B and the OS SCSI drivers 236C.

Figure 4:
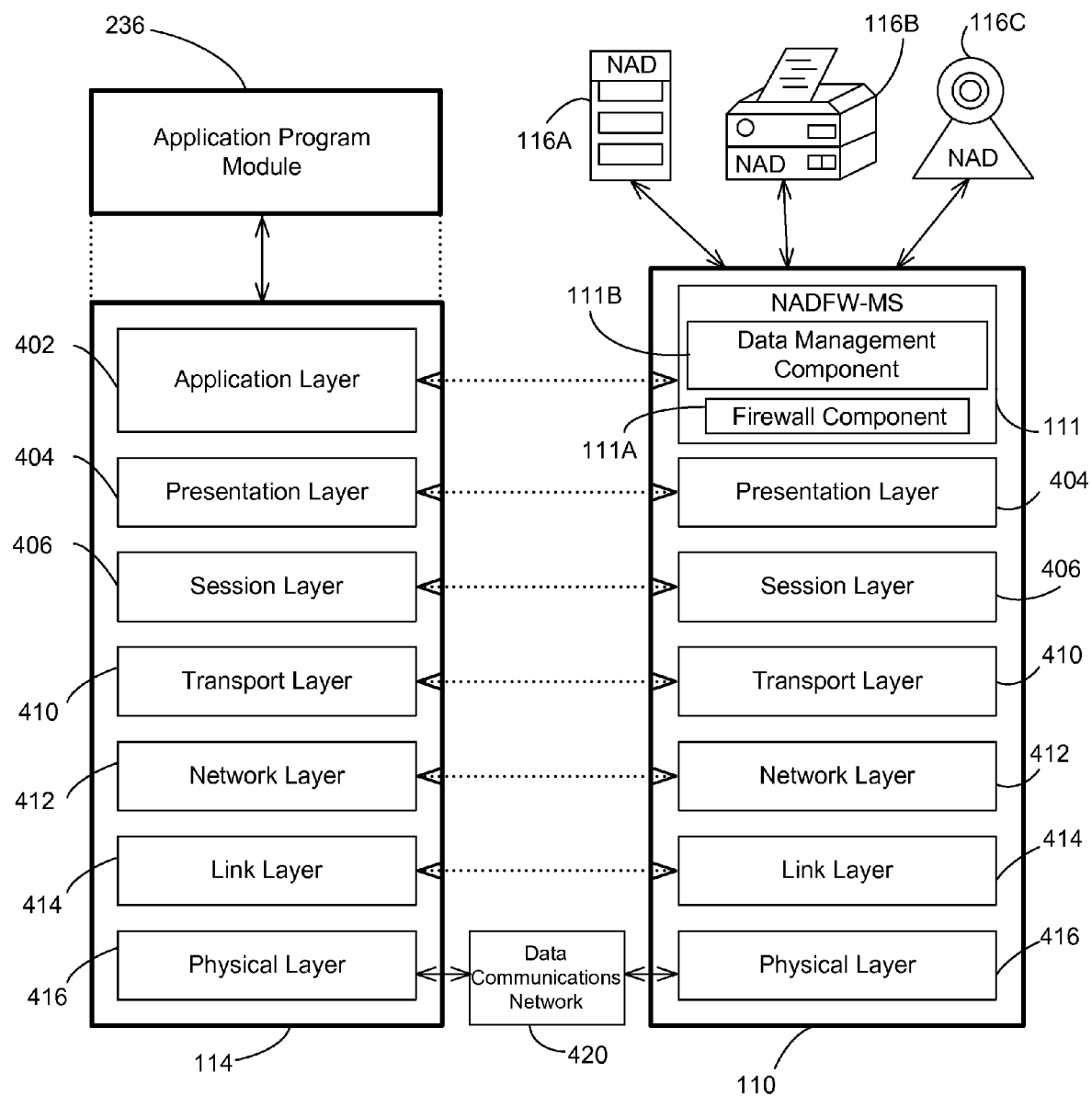
FIG. 4 is a functional block diagram of a communications subsystem for an exemplary NAD server.

FIG. 4 demonstrates an exemplary communications subsystem for the NAD server 110. The exemplary communications subsystem is modeled on the International Standards Organization's Reference Model for Open Systems Interconnection (ISO OSI). As such, the communications subsystem of the NAD server 110 may comprise a number of protocol layers, each of which performs one or more well-defined functions. Protocol layers of the NAD server 110 communicate with the corresponding peer layers in the communications subsystem of the network client 114. The communications subsystem of the NAD server 110 comprises a NADFW-MS layer comprising the NADFW-MS 111. As shown, the NADFW-MS comprises two components: a firewall component 111A and a data management component 111B. The firewall component 111A is responsible for providing security for the associated NADs 116, while the data management component 111B is responsible for interfacing with the NADs 116 to provide the requested NAD-access. The peer layer to the NADFW-MS 111 is the application layer 402 of the network client 114. The application layer 402 is responsible for generating a NAD-access request.

The operation and purpose of the remaining protocol layers are well known in the art. Briefly, however, the presentation layer 404 is concerned with the representation (syntax) of data during transfer between the NADFW-MS 111 and application layer 402. The session layer 406 allows the NADFW-MS layer 111 and application layer 402 to organize and synchronize their dialog and manage their data exchange. The session layer 406 is thus responsible for setting up a dialog channel between the NADFW-MS 111 and application layer 402 for the duration of a network transaction. The transport layer 410 acts as the interface between the higher layers and the underlying network-dependent protocol layers. The transport layer 410 provides the session layer 406 with a message transfer facility that is independent of the underlying network type. The remaining layers (the network layer 412, the link layer 414, and the physical layer 416) are network dependent layers. The network layer 412 is responsible for establishing a network-wide connection between two transport layer protocols. The link layer 414 builds on the physical network connection provided by the particular network to provide the network layer 412 with a reliable information transfer facility. Lastly, the physical layer 416 is concerned with the physical and electrical interfaces between the network client 114 and the NAD server 110.

Figure 5:
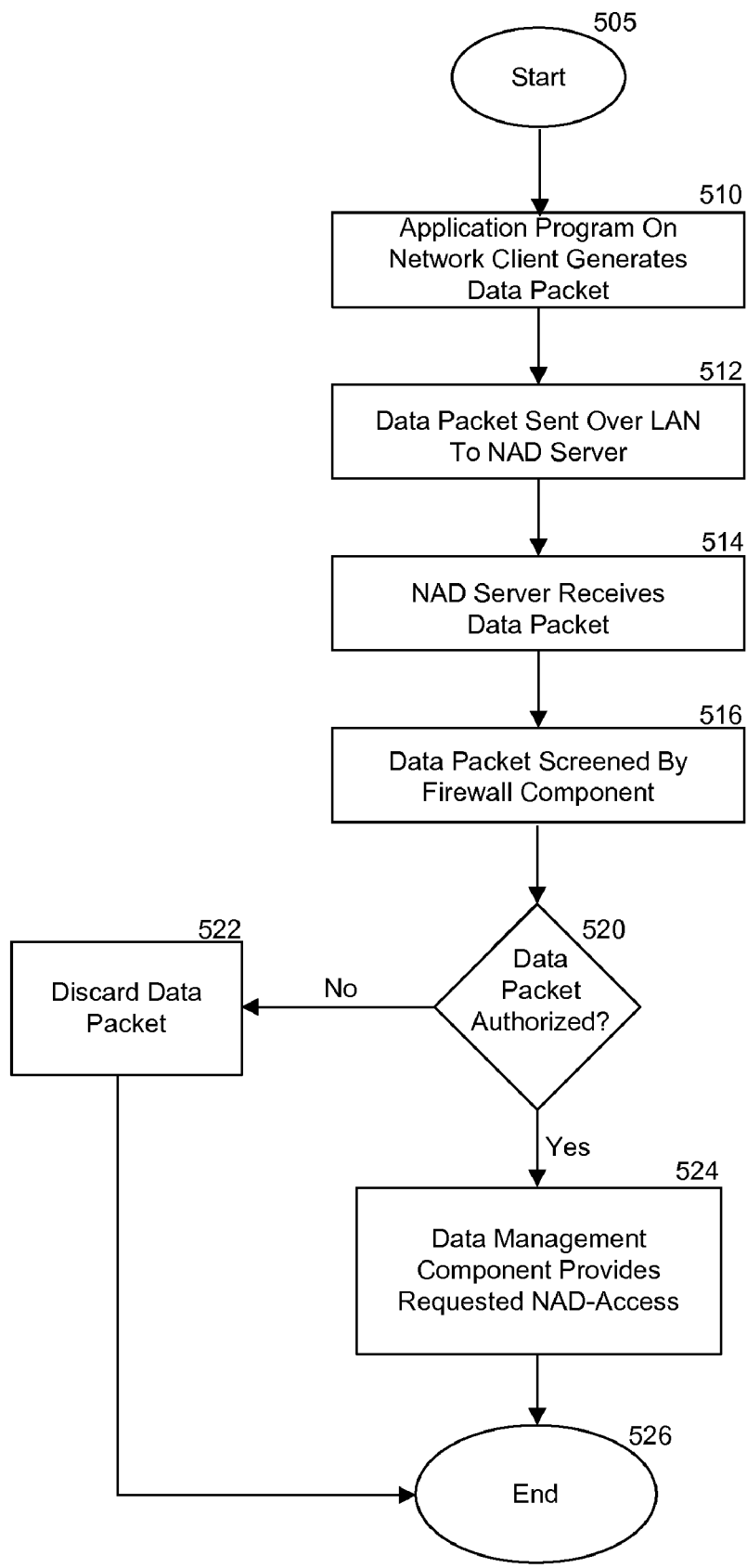
FIG. 5 is a logical flow chart of the general process by which an exemplary NADFW-MS h5 provides security for and access to a NAD.

FIG. 5 provides a flow chart of the general process by which the exemplary NAD server 110 running the exemplary NADFW-MS 111 provides security for and access to an associated NAD 116. The process is initiated at step 505 and proceeds to step 510, during which an application program module at a network client 114 generates a data packet containing a NAD-access request. The data packet includes a header that contains information identifying the source and destination of the data packet, as well as other information. Next, at step 512, the data packet is transported over the LAN 112 and at step 514 the data packet is received by the NAD server 110. Once received at the NAD server 110, the data packet is screened by the firewall component 111A of the NADFW-MS 111 at step 516. Screening of the data packet by the firewall 111A may involve several types of filtering teats, which are described in greater detail below with reference to FIG. 6. Only an authorized data packet will pass through the firewall component 111A of the NADFW-MS 111. Thus, at step 520, if the data packet is determined to be unauthorized, the process proceeds to step 522, in which the unauthorized data packet is discarded. After a data packet is discarded, the process is terminated at step 526. If, at step 520, the data packet is determined to be authorized, the data packet is forwarded to the data management component 111B of the NADFW-MS 111 at step 524, in which the requested NAD-access is provided.

Figure 7:
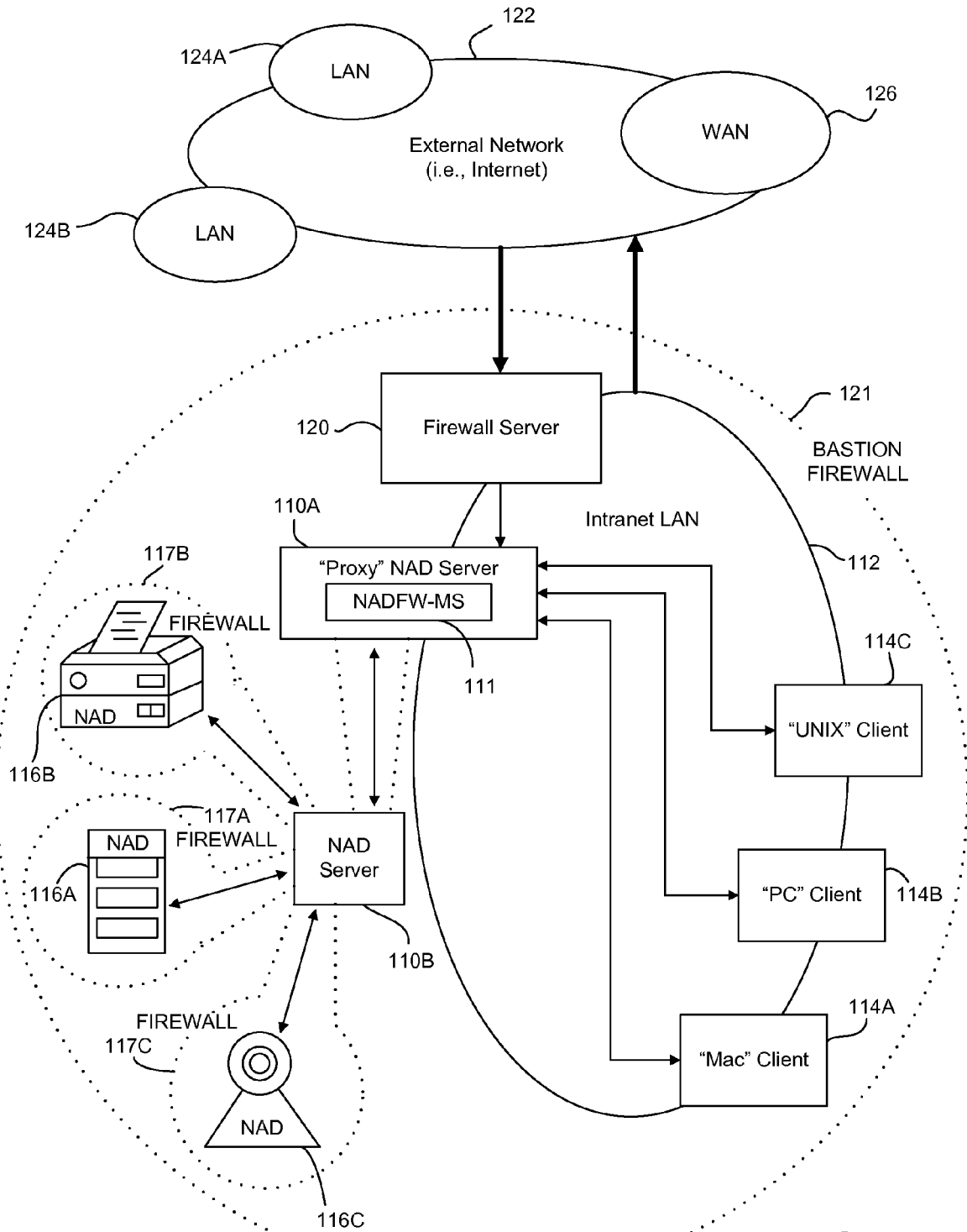
FIG. 7 is a functional block diagram of the general architecture of an alternative, exemplary embodiment of the present invention.

The data management component 111B may act as a traditional NAD server by providing direct access to a NAD 116 (as shown in FIG. 1), or may act as a "proxy" NAD server 110A for another NAD server 110B (as shown in FIG. 7). Still referring to FIG. 7, as a proxy NAD server 110A, the data management component 111B generates a new packet to communicate the NAD-access request to the other NAD server 110B. In this fashion, even if a data packet passes the firewall component 111A, the data packet does not reach its destination, i.e., the other NAD server 110B. Rather, the data management component 111B establishes a link to the other server 110B and generates a new data packet. Such an additional link provided by a proxy server 110A is often used for network security as a further layer of separation between network clients 114 and NAB servers. After the requested NAD-access is provided for an authorized data packet, the process is terminated at step 526.

Figure 6:
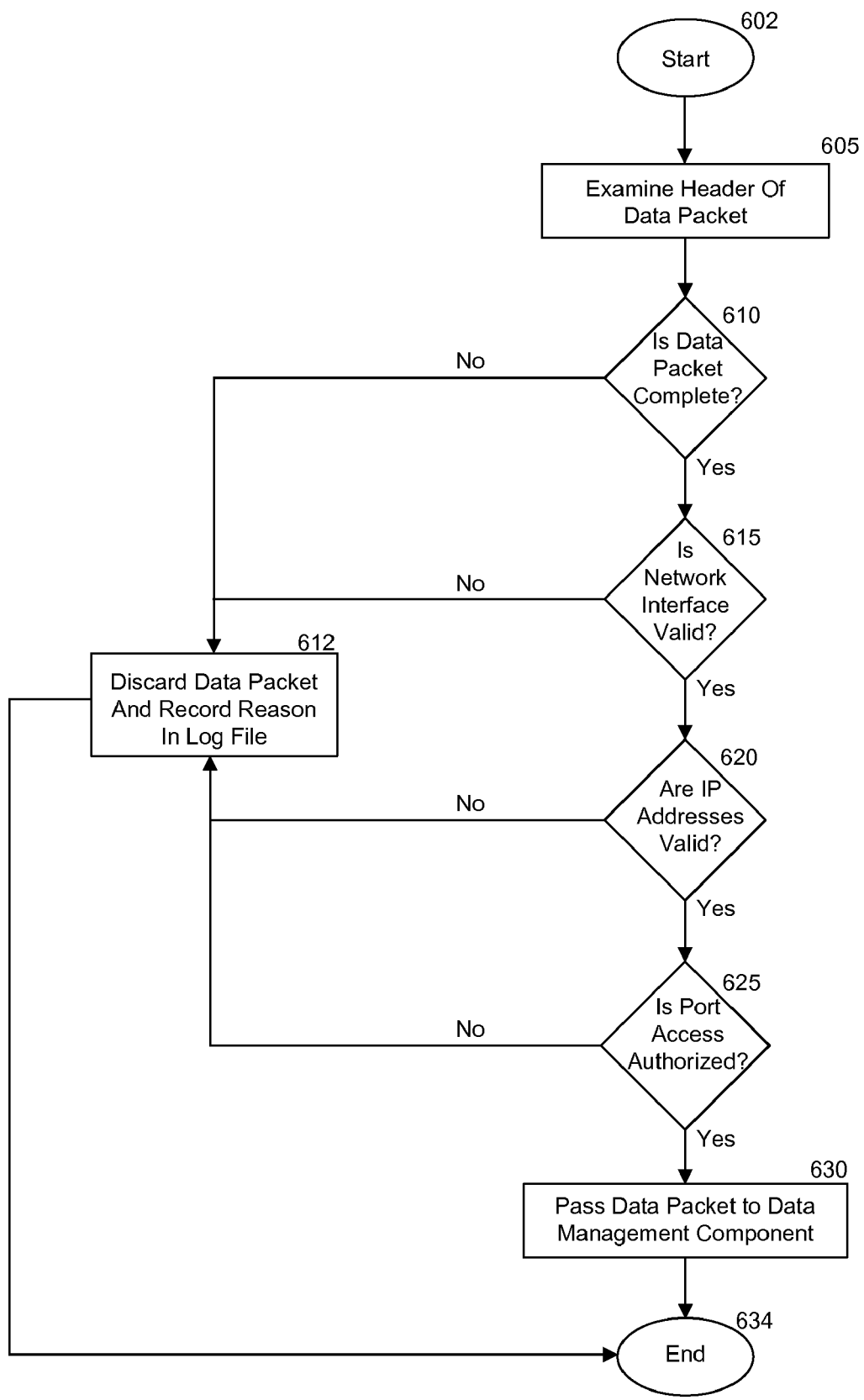
FIG. 6 is a flowchart of an exemplary method of data packet filtering performed by an exemplary NADFW-MS.

The flowchart of FIG. 6 describes the steps involved in an exemplary method of data packet filtering performed by the firewall component 111A of the NADFW-MS 111. The firewall component 111A provides a series of filtering tests that a data packet must endure before being passed on to the data management component 111B of the NADFW-MS 111. The method is initiated at step 602 and continues to step 605, during which the firewall component 111A examines the header of a data packet. Initially, the firewall component 111A determines whether the data packet meets certain minimum format requirements. For example, a particular network protocol may require the header of a data packet to contain certain fields, having certain information and comprising a certain number of bytes. If the necessary information is not included in the data packet, the data packet is deemed incorrectly configured and is removed from further consideration. Thus, at step 610, if the in-coming data packet header is determined to be incomplete or fails to meet other pre-determined specifications, the data packet is immediately discarded at step 612. In the exemplary embodiment, whenever a data packet is discarded at step 612, the reason for discarding the data packet is written to a log file. The log file may be maintained over time and periodically analyzed for security purposes. As an illustration, it may be determined upon examination of the log file that a certain network client makes repeated attempts to access a NAD 116 without proper authorization. A network administrator may then perform an appropriate investigation. After a data packet is discarded, the method is terminated at step 634.

If the data packet is determined at step 610 to be complete, the method proceeds to step 615, where a determination is made as to whether the data packet arrived via an authorized network interface 253. In this way, the NADFW-MS 111 is able to screen a data packet based on the particular network node from which the data packet was sent. This mechanism provides the NADFW-MS 111 with multi-directional access control. Data packets coming from certain network connections may be accepted, while data packets coming from other network connections may be discarded and logged at step 612. Again, after a data packet is discarded, the method is terminated at step 634.

Next, at step 620, a determination is made as to whether the header of the data packet contains valid and authorized source and destination address information. If the IP addresses of the data packet's source and destination are invalid or unauthorized, the packet will be denied and discarded at step 612. Again, if a data packet is discarded, the reason for discarding the data packet is recorded in the log file at step 612 and the method ends at step 634.

If the data packet contains valid IP addresses, a final test in the exemplary data packet filtering method is performed. At step 625, the header of the data packet is checked to ensure that it includes the proper information to gain access to the proper port of the NADFW-MS 111. Since the exemplary NAD server 110 implements a variety of OS network protocol programs 235A, the NADFW-MS 111 can also limit NAD-access based on which port an OS network protocol program 235A uses. Before a network client 114 sends an authorized NAD-access request to the NAD server 110, the transport layer 410 of the NAD server 110 alerts the transport layer 410 of the network client 114 as to which port a data packet should be sent and what information should be included in the data packet header. For example, the NAD server 110 may dictate that all "Netware" based data packets include certain designated information and be directed to port "X." If an in-coming "Netware" based data packet attempts to access any port other than port "X," or attempts to access port "X" but does not include the designated information, the data packet will be discarded and the reason for discarding the data packet will be logged at step 612. If a data packet is discarded, the method terminates at step 634. However, if a data packet successfully passes all of the above filtering tests, the data packet is considered to be authorized and at step 630 is passed to the data management component 111B. After step 630, the method is terminated at step 634.

As previously mentioned, FIG. 7 illustrates an alternative embodiment of the present invention. FIG. 7 is similar to FIG. 1, however, instead of having a traditional NAD server 110, which provides direct access to each MAD 116, LAN 112 includes a "proxy" NAD server 110A and another NAD server 110B. NADs 116 are connected directly to the NAD server 110B, which is isolated from other nodes on the LAN 112 and external to the LAN 112 by means of the "proxy" NAD server 110A. Such an arrangement provides greater network security because data packets received by the "proxy" server 110A are not forwarded to the NAD server 110B but rather processed by the "proxy" server 110A, which, in turn, generates new data packets that are then forwarded to the NAD server 110B, as discussed above.

Figure 8:
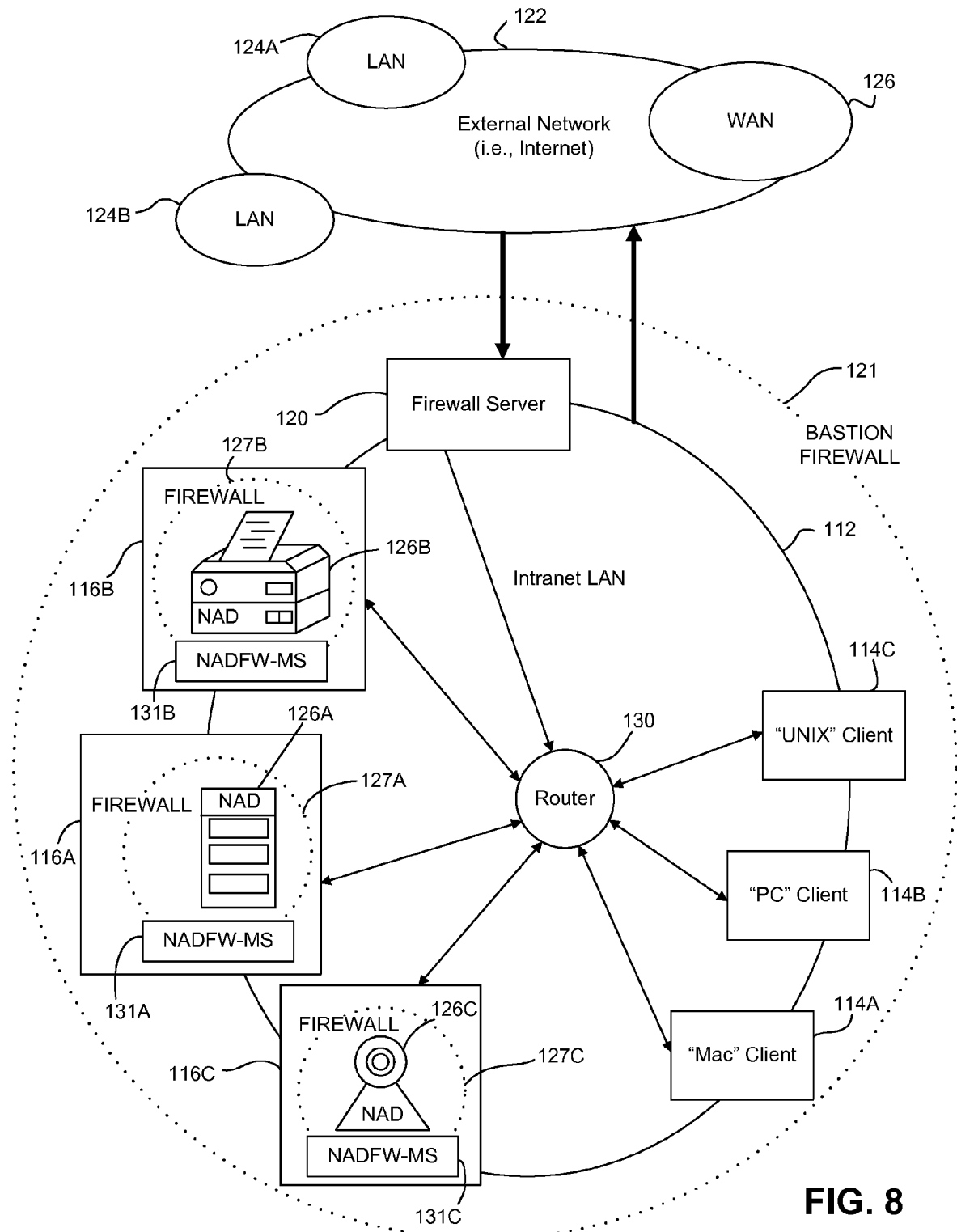
FIG. 8 is a functional block diagram of the general architecture of another alternative, exemplary embodiment of the present invention.

FIG. 8 illustrates another alternative embodiment of the present invention. FIG. 8 is also similar to FIG. 1, however, rather than each NAD 116 being connected to the LAN 112 through a NAD server 110, each NAD 116 is a separate node connected directly to the LAN 112. With this arrangement, each NAD 116A-C has installed therein its own NADFW-MS 131A-C, which wraps a dedicated firewall 127A-C around the operational components 126A-C, respectively, of the NAD 116A-C in which it is installed. Data packets from nodes internal or external to the LAN 112 are routed to the appropriate NAD 116 by means of a convention network router, hub, or switch 130. Filtering and processing of the data packet is then handled by the appropriate NADFW-MS 131A-C associated with the particular NAD 116A-C that receives the data packet.

In view of the foregoing, it will be appreciated that the present invention provides a method and system for securely managing a network attached device (NAD). The present invention provides a NAD with an second layer of firewall security, over and above that which may be provided by a bastion firewall. A bastion firewall may provide a first layer of security by screening externally generated NAD-access requests. However, the present invention introduces another firewall that is dedicated exclusively to the protection of a NAD itself or to data stored on the NAD. The firewall of the present invention is wrapped exclusively around a NAD and filters NAD-access requests that are generated both internally to a LAN and externally from the LAN based on IP addresses and other information contained in the header of a data packet. Still, it should be understood that the foregoing relates only to the exemplary embodiments of the present invention, and that numerous changes may be made thereto without departing from the spirit and scope of the invention as defined by the following claims.

What is claimed is:

1. A network arrangement comprising:
an internal network;
a network client coupled to the internal network;
a network attached device (NAD) server coupled to the internal network; and
a NAD coupled to the NAD server in such a manner that the NAD server controls access to and from the NAD;
the NAD server configured to receive from the network client over the internal network a request contained in a data packet for network access to the NAD and to filter the data packet to determine, based at least on an IP address in a header of the data packet, whether the received request for network access to the NAD should be authorized, the NAD server further configured to process the data packet for communication with the NAD and to provide the network client with access to the NAD upon determining that the request for access is authorized, and to deny access to the NAD otherwise.

2. The network arrangement of claim 1, wherein the network arrangement further comprises a firewall coupled between the internal network and an external network, and wherein the NAD server is configured to protect the NAD from unauthorized access requests independently of an external firewall.

3. The network arrangement of claim 2 further comprising an operating system configured to process an authorized data packet.

4. The network arrangement of claim 3 wherein the operating system is further configured to process the authorized data packet according to a plurality of network protocols.

5. The network arrangement of claim 2 comprising a data manager component comprising an interface component configured to communicate with the NAD.

6. The network arrangement of claim 5 comprising one or more interface components is configured to receive the authorized data packet in a network protocol and communicate with the NAD using an interface mechanism.

7. The network arrangement of claim 5 wherein the data manager is configured to establish a link with another server and send the authorized data packet to another server over the link.

8. The network arrangement of claim 2 wherein the NAD server is further configured to filter the data packet based on one or more of a network interface of the client, network port, or network protocol.

9. The network arrangement of claim 1 wherein the NAD is configured to determine whether the received requests for network access to the NAD should be authorized by determining whether the header includes information relating to a network source.

10. A method, comprising:
processing, by a network attached device (NAD) server coupled to an internal network, a request for network access to a NAD device, the NAD device coupled to the NAD server and configured to receive communication from an internal network only by way of the NAD server, the request for network access including a data packet that includes at least an IP header, the NAD server comprising a NAD server firewall;
determining, by the NAD server firewall, whether the request for network access to the NAD should be authorized or denied based on a filtering of at least the IP header of the data packet of the received request for network access to the NAD;
processing, by the NAD server, the data packet for communication with the NAD and enabling access to the NAD upon determining that the requested network access to the NAD should be authorized, and
blocking, by the NAD server, access to the NAD upon determining that the request for network access to the NAD should be denied.

11. The method of claim 10 wherein the NAD server comprises an operating system, the operating system processing the packet upon authorization.

12. The method of claim 11 wherein the operating system processing the data packet comprises processing the data packet according to one of a plurality of network protocols.

13. The method of claim 10 wherein the NAD server comprises a data manager component, the data management component having direct access to the NAD.

14. The method of claim 13 wherein the data manager establishes a link with another server and sends a data packet over the link after the data packet is authorized.

15. The method of claim 10 wherein the NAD server further filters the data packet based on one or more of a network interface of the client, network port, or network protocol.

16. The method of claim 10 further comprising communicating with a client over an internal network and communicating with an external network firewall that is coupled between the internal network and an external network, the external network firewall protecting the internal network from communications originating on the external network, and wherein the NAD server protecting the NAD from unauthorized access requests by the NAD server independently of the external network firewall.

17. A non-transitory computer-readable storage medium having stored thereon instructions that upon execution by a computing device, cause the acts comprising:

processing, by a network attached device (NAD) server, a request for network access to a NAD device, the NAD device coupled to the NAD server by way of an interface such that all requests for access to the NAD device are processed by the NAD server, the request for network access including a data packet that includes at least an IP header;

filtering of at least the IP header of the data packet of the received request for network access to the NAD;

authorizing, by the NAD server firewall, the request for network access to the NAD based on information in the IP header indicating the source and destination of the data packet;

processing the data packet for communication with the NAD and enabling access to the NAD upon authorization of the requested network access to the NAD, and blocking access to the NAD of request for network access to the NAD that are not authorized.

18. The computer-readable storage medium of claim 17 having stored thereon instructions that upon execution by a computing device, further cause instantiating an operating system on the NAD server, the operating system processing the packet upon authorization.

19. The computer-readable storage medium of claim 18 wherein processing the data packet by the operating system comprises processing the data packet according to one of a plurality of network protocols.

20. The computer-readable storage medium of claim 17, wherein the NAD server comprises a data manager component, the data management component having direct access to the NAD.

21. The computer-readable storage medium of claim 20 having stored thereon instructions that upon execution by a computing device, further cause the data manager to establish a link with another server and sends a data packet over the link after the data packet is authorized.

22. The computer-readable storage medium of claim 17 wherein the NAD server further filters the data packet based on a network interface of the client.

* * * * *

UNITED STATES PATENT AND TRADEMARK OFFICE
CERTIFICATE OF CORRECTION

PATENT NO. : 8,306,994 B2
APPLICATION NO. : 12/773716
DATED : November 6, 2012
INVENTOR(S) : Kenworthy It is certified that error appears in the above-identified patent and that said Letters Patent is hereby corrected as shown below:

On the Title Page 2, Item (56), under "OTHER PUBLICATIONS", Lines 1-3, delete "Menasce, Daniel A. et al., ......... 180-189.".

On the Title Page 2, Item (56), under "OTHER PUBLICATIONS", Line 4, delete "MAss" and insert -- Mass --, therefor.

On the Title Page 2, Item (56), under "OTHER PUBLICATIONS", Line 17, delete "internetwold" and insert -- internetworld --, therefor.

In Column 1, Line 27, delete "DVI)" and insert -- DVD --, therefor.

In Column 3, Line 9, delete "h5 provides" and insert -- provides --, therefor.

In Column 3, Line 40, delete "NADFWMS" and insert -- NADFW-MS --, therefor.

In Column 3, Line 46, delete "typo" and insert -- type --, therefor.

In Column 5, Line 18, delete "238" and insert -- 236 --, therefor.

In Column 5, Line 54, delete "A5 should" and insert -- should --, therefor.

In Column 6, Line 40, delete "236C." and insert -- 235C. --, therefor.

In Column 7, Line 33, delete "teats," and insert -- tests, --, therefor.

In Column 7, Line 59, delete "NAB" and insert -- NAD --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,306,994 B2

In Column 9, Line 7, delete "MAD" and insert -- NAD --, therefor.

In Column 9, Line 36, delete "an" and insert -- a --, therefor.